United States Patent
Mayer

(10) Patent No.: US 10,618,682 B2
(45) Date of Patent: Apr. 14, 2020

(54) VERSATILE TRASH BAG

(71) Applicant: Menashe Mayer, Brooklyn, NY (US)

(72) Inventor: Menashe Mayer, Brooklyn, NY (US)

(73) Assignee: Handy Products Inc., Brooklyn, NY (US)

( * ) Notice: Subject to any disclaimer, the term of this patent is extended or adjusted under 35 U.S.C. 154(b) by 129 days.

(21) Appl. No.: 16/042,817

(22) Filed: Jul. 23, 2018

(65) Prior Publication Data

US 2018/0346173 A1 Dec. 6, 2018

Related U.S. Application Data

(60) Provisional application No. 62/646,275, filed on Mar. 21, 2018.

(51) Int. Cl.
| | | |
|---|---|---|
| *B65B 67/12* | (2006.01) | |
| *B65F 1/00* | (2006.01) | |
| *B65F 1/02* | (2006.01) | |
| *B60R 7/08* | (2006.01) | |
| *B65F 1/14* | (2006.01) | |
| *B65D 33/28* | (2006.01) | |
| *B65D 75/00* | (2006.01) | |
| *B60R 11/00* | (2006.01) | |

(52) U.S. Cl.
CPC ........... *B65B 67/1238* (2013.01); *B60R 7/08* (2013.01); *B65B 67/1233* (2013.01); *B65F 1/002* (2013.01); *B65F 1/0013* (2013.01); *B65F 1/1415* (2013.01); *B60R 2011/0012* (2013.01); *B65D 33/28* (2013.01); *B65D 75/008* (2013.01); *B65F 2250/108* (2013.01); *B65F 2250/1143* (2013.01)

(58) Field of Classification Search
CPC ......... A45C 13/26; A45C 13/28; A45F 5/102; A45F 5/1046; B60R 7/08; B60R 2011/0012; B65B 67/1233; B65B 67/1238; B65D 25/28; B65D 25/2802; B65D 25/2882; B65D 25/30; B65D 33/28; B65D 63/18; B65D 75/008; B65F 1/0013; B65F 1/002; B65F 1/1415; B65F 2250/108; B65F 2250/1143
USPC ...... 16/114.1, 410, 411, 430; 211/54.1, 57.1, 211/113; 248/99, 100, 101, 221.12, 248/222.41, 223.21; 383/22, 23, 24, 33, 383/34, 34.1
See application file for complete search history.

(56) References Cited

U.S. PATENT DOCUMENTS

| | | | | |
|---|---|---|---|---|
| 991,081 | A * | 5/1911 | Parr | B65B 67/12 248/99 |
| 2,163,759 | A * | 6/1939 | McCann | A47C 7/64 297/188.2 |
| 3,332,655 | A * | 7/1967 | Van Buren, Jr. | A47B 57/58 248/235 |

(Continued)

FOREIGN PATENT DOCUMENTS

FR 2733967 A1 * 11/1996 ............. B65F 1/141

*Primary Examiner* — Joshua E Rodden
(74) *Attorney, Agent, or Firm* — Guy Cumberbatch

(57) ABSTRACT

A versatile trash bag has a mouth that is biased open to facilitate putting refuse in the bag and a plurality of handles for hanging the bag from a variety of objects. The trash bag is maintained in a wide-open configuration to facilitate a user's ability to place trash or access the contents therein. The bags also have structure to close and seal the open mouth.

17 Claims, 3 Drawing Sheets

(56) References Cited

U.S. PATENT DOCUMENTS

| | | | |
|---|---|---|---|
| 3,455,528 A * | 7/1969 | Meyer | F16L 3/24 |
| | | | 248/73 |
| 3,861,630 A * | 1/1975 | Ady | B65B 67/125 |
| | | | 248/100 |
| 3,978,540 A | 9/1976 | Peck | |
| 4,026,340 A | 5/1977 | Sobolik | |
| 4,069,994 A * | 1/1978 | Wharmby | B65B 67/125 |
| | | | 248/101 |
| 4,101,104 A * | 7/1978 | Minard | A47G 1/17 |
| | | | 248/205.3 |
| 4,287,701 A | 9/1981 | Washington | |
| 4,867,576 A | 9/1989 | Boyd | |
| 4,979,833 A * | 12/1990 | Cook | A45C 3/00 |
| | | | 383/109 |
| 5,022,767 A | 6/1991 | Cardulla | |
| 5,044,774 A | 9/1991 | Bullard | |
| 5,061,086 A * | 10/1991 | Vallerga | A45C 1/00 |
| | | | 150/102 |
| 5,118,019 A * | 6/1992 | Harrison | B60K 15/05 |
| | | | 224/555 |
| 5,160,196 A | 11/1992 | Curtis | |
| 5,346,311 A | 9/1994 | Siler | |
| 5,377,941 A * | 1/1995 | Har | B65B 67/1233 |
| | | | 248/101 |
| 6,371,642 B1 * | 4/2002 | Nelson | A47L 15/505 |
| | | | 150/900 |
| 6,494,619 B1 | 12/2002 | Sulpizio | |
| 6,688,562 B1 | 2/2004 | Harvey | |
| 7,883,062 B2 * | 2/2011 | Zima | B65F 1/1415 |
| | | | 248/230.8 |
| 7,946,764 B2 | 5/2011 | Sulpizio | |
| 8,376,200 B2 * | 2/2013 | Kim | B60R 11/00 |
| | | | 224/275 |
| 9,682,809 B2 | 6/2017 | Hartley | |
| 2003/0190097 A1 * | 10/2003 | Hajianpour | B65D 33/007 |
| | | | 383/9 |
| 2008/0044111 A1 | 2/2008 | Faraone | |
| 2011/0147545 A1 * | 6/2011 | Faraone | B65B 67/1227 |
| | | | 248/99 |

\* cited by examiner

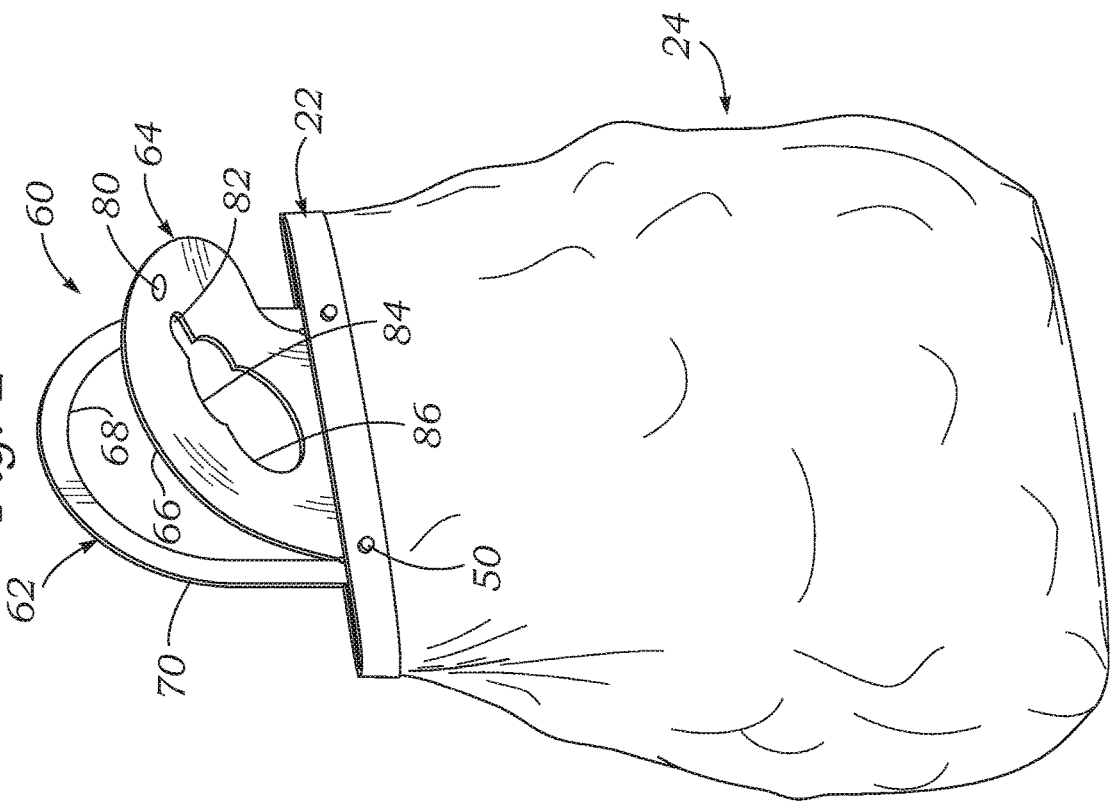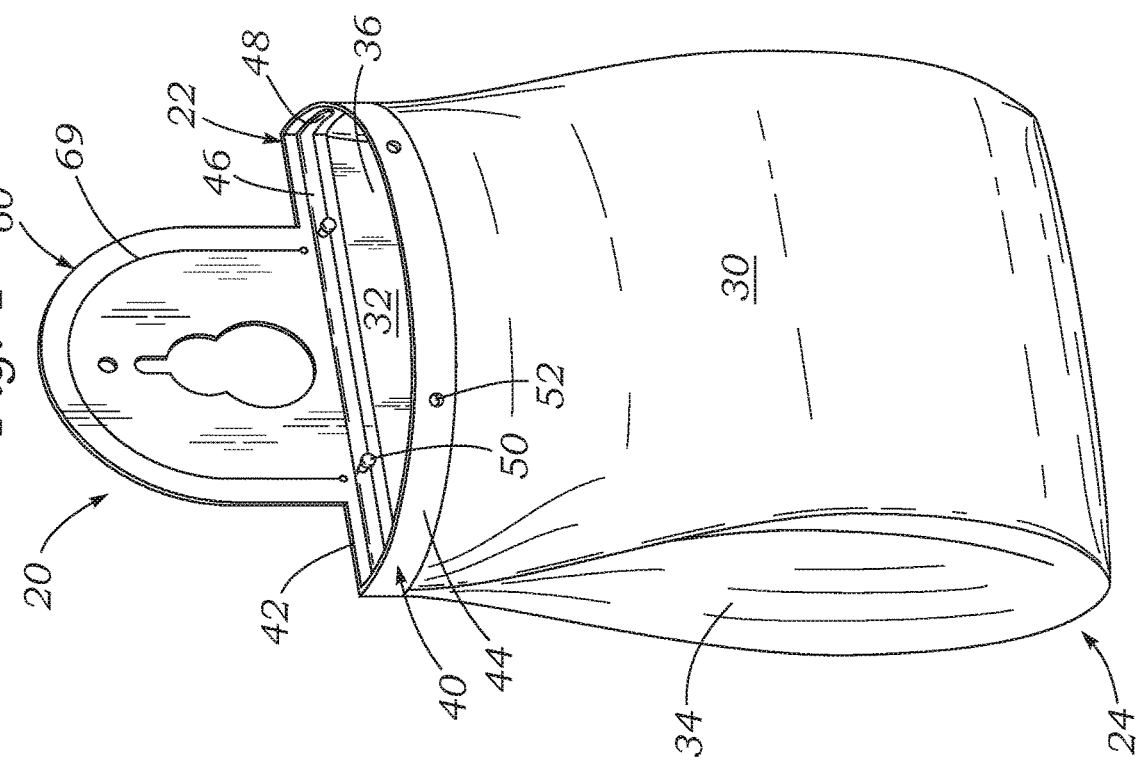

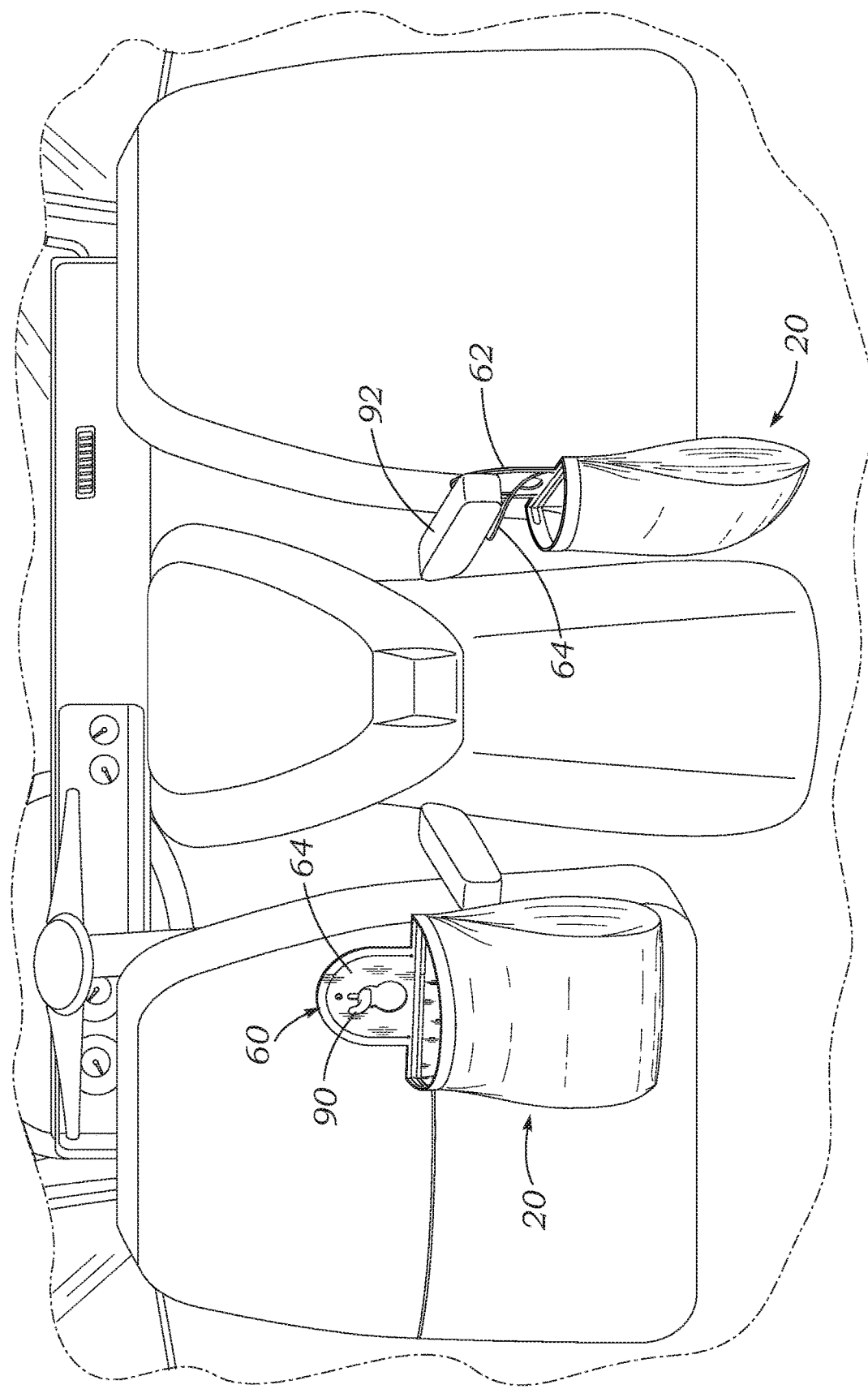

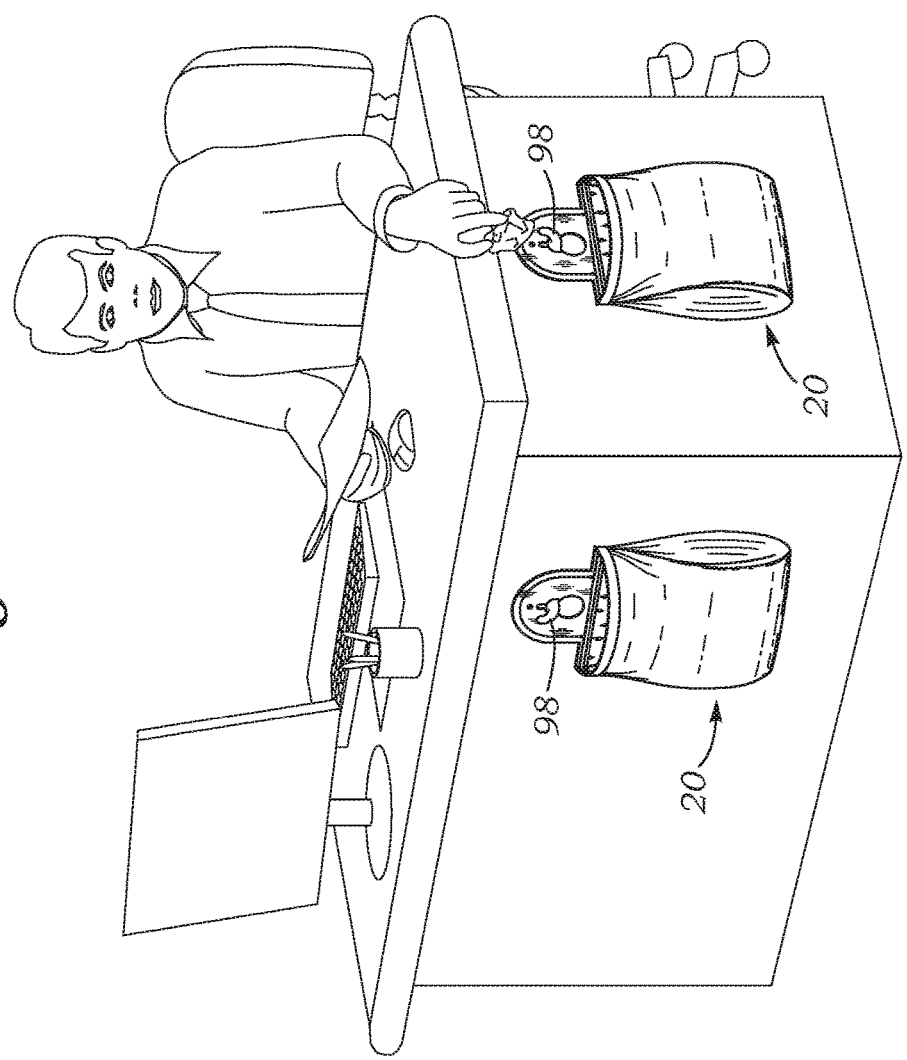
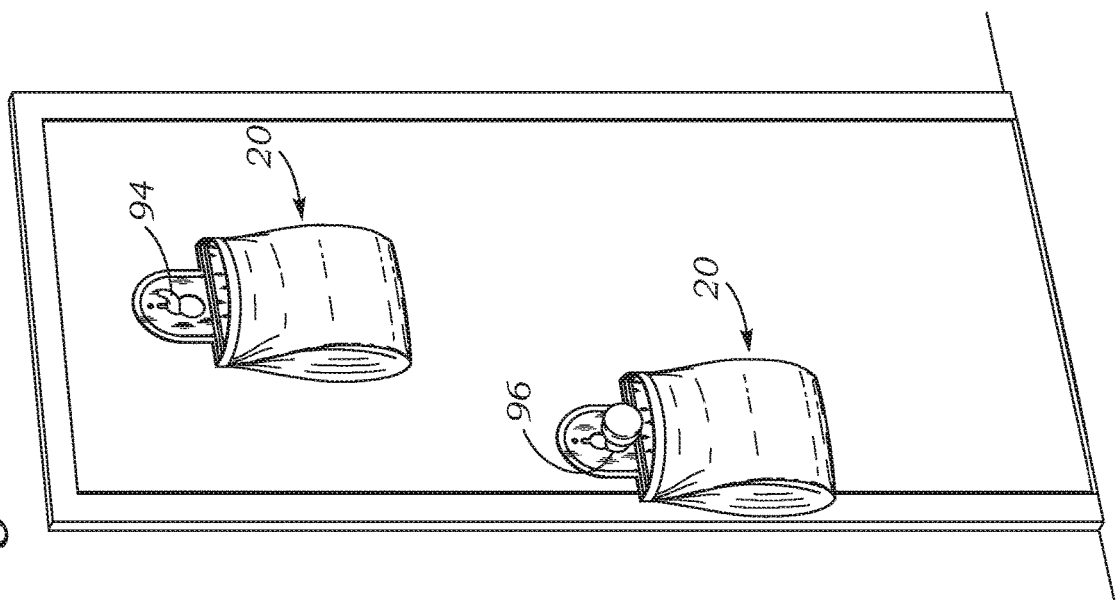

VERSATILE TRASH BAG

RELATED APPLICATIONS

The present application claims priority under 35 U.S.C. 119 to U.S. Provisional Application Ser. No. 62/646,275, filed Mar. 21, 2018, the contents of which are expressly incorporated herein by reference.

FIELD OF THE INVENTION

The present application is directed to a trash receptacle and, more particularly, to a trash bag that is biased open and may be suspended in a variety of different environments.

BACKGROUND OF THE INVENTION

Drawstring-type bags and pouches are well known in the art, as also are twist-tie-type bag closure members and locking strap members that are used to simply tie a bag closed after it has been filled. While most bag closure devices and constructions may serve adequately to close the open end of a bag, some are also intended or operable to also retain the open end of a bag in fully open condition for filling, etc.

Typically, the plastic trash bags bag of one size or another are intended to be kept in one stationary location and held in an open position for ease of refuse disposal. U.S. Pat. No. 5,044,774 teaches a bag having a stiff strip around the mouth of the bag that is configured to hold the bag top in open condition, however this construction is not capable of or intended to close the bag securely after filling. U.S. Pat. No. 5,346,311 and U.S. Patent Publication Nos. 2008/0044111 and 2009/0014603 also disclose bags that include ways to hold the mouth open.

Despite a number of trash bags available, there is a need for a trash bag having a mouth that is held open that can be used in a variety of different environments.

SUMMARY OF THE INVENTION

The present disclosure relates in general to bags for items, and more particularly to bags and pouches, such as trash bags, which are maintained in a wide-open configuration to facilitate a user's ability to place trash or access the contents therein. The flexible bags have structure to maintain an open mouth and also to close and seal the open mouth. More particularly, the bag construction is arranged with a stiff member that is configured to hold the open end of the bag in fully open condition during use and further operates to quickly and easily close the open end of the bag in sealed, positively locked condition after use. Further, the bag has a handle assembly that facilitates suspension of the bag from a variety of differently-sized objects. In one embodiment, a larger handle surrounds a nested handle, with the latter having multiple apertures of different sizes for hanging the bag from different objects. The larger handle is preferably molded along with the nested handle and connected thereto via a score line which can easily be severed to separate the handles.

BRIEF DESCRIPTION OF THE DRAWINGS

Features and advantages of the present invention will become appreciated as the same become better understood with reference to the specification, claims, and appended drawings wherein:

FIG. 1 is a perspective view of an exemplary trash bag empty of trash bag with an upper mouth biased open;

FIG. 2 is a perspective view of the trash bag full and the mouth closed;

FIG. 3 illustrates two of the trash bags hanging from different objects within a vehicle passenger compartment;

FIG. 4 shows two of the trash bags hanging from different objects on a door; and FIG. 5 shows several of the trash bags hanging from the outside of an office desk.

DETAILED DESCRIPTION OF THE PREFERRED EMBODIMENTS

The present application provides an improved trash bag which has a mouth biased open but also has snaps or other closures to seal trash in the bag when full. The bag also has several convenient handles to enable suspension of the bag from a variety of objects found in different environments. One purpose is to help a vehicle driver to have easy access to put trash in the trash bag so as to avoid looking for the opening of the bag during driving. Likewise, an office employee may hang the bag nearby for easy access, or the bag may be hung from numerous residential or commercial locations. The preferably disposable nature makes cleanup easier. The suspension of an open-mouthed trash bag nearby will eliminate trash dropping on the floor of the car, home or office. The advantage is the provision of small plastic bags attached to a flexible plastic piece that will keep the bag open wherever you place it. Once the bag is full, you throw away the entire thing, as every bag comes attached to a disposable holder.

Although the present application mainly discusses the use of the bags disclosed herein for collecting trash, the bags could of course be put to other uses. For instance, the bag may be filled with usable items which are in frequent need, such as for example pods for brewing machines, and then the bag hung open adjacent the place of use. Consequently, the bags should not be considered to be exclusively for receiving trash. Likewise, although cheap disposable bags are the primary application of the bag configuration disclosed, the bags may be constructed of more durable materials so as to be reusable.

FIG. 1 is a perspective view of an exemplary trash bag 20 that is empty and viewed upright with an upper mouth 22 in an open position. The bag 20 includes a flexible pouch portion 24 that depends down from the upper mouth 22. The pouch portion 24 may be configured in a variety of ways, such as having a front panel 30, a rear panel 32, and pleated sides 34 which permit expansion of an inner cavity 36 when items are introduced through the mouth 22. Preferably, the pouch portion 24 is initially folded flat and the upper mouth 22 provided closed, such as seen in FIG. 2, so that multiple trash bags 20 may be stacked together for shipping and storage.

The upper mouth 22 is defined by an upper edge (not numbered) of the pouch portion 24 secured to a stiff rim 40. The stiff rim is formed of a narrow band of material that is more rigid or simply thicker than the flexible material of the pouch portion 24. The rim 40 preferably includes a relatively straight rear strip 42 integrally formed with convex front strip 44. The material of the rim 40 is a relatively stiff polymer such that it assumes the shape shown in FIG. 1 in a relaxed state. That is, the convex front strip 44 is biased away from the rear strip 42 generally in a semi-circle in the absence of any other closing force, resulting in the open mouth 22 as shown. Additionally, a secondary strip 46 of even stiffer material may be secured along the rear strip 42 with small tabs 48 on both sides extending forward a short distance along the front strip 44 beyond the intersection of the two strips. This secondary strip 46, and in particular the small tabs 48, reinforces the elastic biasing force of the front strip 44 and helps ensure the mouth 22 stays open.

In one embodiment, the upper mouth 22 has a width as measured along the rear strip 42 of about 7.0 inches. The convex front strip 44 may be secured substantially flush against the rear strip 42, as will be explained, but is biased away from the rear strip to form the convex or semi-circular shape shown, preferably with a front to rear dimension of at least 4.5 inches to accommodate standard coffee/soda cups or soda bottles. The pouch portion 24 may be about 12 inches wide and 17 inches in height, and secured in folds at its top edge to the smaller mouth 22. In this way, the pouch portion 24 may significantly expand when filled with trash, as seen in FIG. 2. In one embodiment, the side pleats 34 enable expansion of the pouch portion 24 to a considerably internal volume. For instance, a 12×17 inch pouch portion 24 that expands to a front-to-rear depth of only 1 inch can hold a little more than 3 liters. In a preferred embodiment, the volume may expand to between about 7-15 liters.

Desirably, the pouch portion 24 is made of a highly flexible material, preferably disposable such as a plastic (polymer). Materials that may be used, depending on the properties desired, include high-density polyethylene (HDPE), low-density polyethylene (LDPE), or linear low-density polyethylene (LLDPE). LLDPE is used for thick, glossy shopping bags such as from a mall, grocery bags use HDPE, and thinner garment bags from the dry cleaner are LDPE. Each of these materials is disposable, and other disposable materials may also be used, such as paper, fabric and the like. As mentioned, the bag 20 may be marketed for uses other than for collecting trash, and may be reusable, such that the material of the pouch portion 24 is a more durable fabric (i.e., canvas) or reinforced polymer for longer life.

The stiff rim 40 is also desirably made from a disposable material such as a stiff plastic. A common strip to use for the rim 40 is about 1/32-1/16" thick and 0.5-1.0" wide, although thicker and wider materials can also be used. A few of the most common plastics materials we cut to plastic strips are: HDPE (High Density Polyethylene), PTFE, TFE (Polytetrafluoroethylene), UHMW—Ultra High Molecular Weight Polyethylene, Acetal/Delrin, Nylon—Polyamide, PVC—Polyvinylchloride, and Polycarbonate—Covestro (Bayer) Makrolon. In one embodiment, the material of the stiff rim 40 is the same as the material of the pouch portion 24 which helps in securing together the open top edge of the pouch portion 24 to the rim 40, such as with adhesive or by heat welding. For instance, a 1.0 inch wide strip of 1/16" thick HDPE may be heat sealed around the top edge of a pouch portion 24 of 2.25 mil thick HDPE.

The upper mouth 22 is biased open by the stiff rim 40, and in particular by the elasticity of the convex front strip 44 and optionally by the secondary strip 46. However, the stiff rim 40 is also provided with a closure assembly so that during shipping, or after the pouch portion 24 is full, the mouth 22 can be closed. In the illustrated embodiment, the closure assembly includes a plurality of small beads 50 that project forward from the rear strip 42, or possibly from the secondary strip 46. The beads 50 preferably have a short shank or neck (not shown) connected to the strip 42 which spaces the larger bead 50 a short distance away from the strip. The convex front strip 44 is provided with a complementary number of holes 52 which are sized slightly smaller than the beads 50. Pressing the beads 50 through the holes 52 as seen in FIG. 2 creates a closure. The beads 50 are large enough relative to the holes 52 to withstand the opening force presented by the elasticity of the convex front strip 44. In the illustrated embodiment there are 2 bead/hole pairs, though three or more are also contemplated, which partly depends on the width of the mouth 22. Various other closures are also possible, such as a zipper-like assembly, Velcro, an adhesive strip which may be exposed by pulling away a covering, etc. The application should not be considered limited to the illustrated embodiment.

A multi-purpose handle assembly 60 extends upward from the rear strip 42 of the rim 40 and provides a variety of ways to suspend the bag 20 from different objects, as will be shown. In its original shape, see in FIG. 1, the handle assembly 60 is flat or two-dimensional, and extends upward in the plane of the rear panel 32 of the pouch portion 24 and straight rear strip 42. In this way, the bag 20 may be hung from a peg, hook, or the like to lie flush on a flat wall and project normally outward therefrom for ease of access.

The handle assembly 60 is seen in FIG. 2 with an outer large handle portion 62 separated from an inner nested handle portion 64. In the illustrated embodiment, the nested handle portion 64 has a generally convex curved outer peripheral edge 66 which corresponds to the shape of an inner edge 68 of the large handle portion 62. In one embodiment, the large handle portion 62 and nested handle portion 64 are molded from a single unitary piece of plastic material with the edges 66, 68 formed by a common score line 69 (FIG. 1) so that one need only sever the score line and thus separate the two handles using manual pressure. More preferably, the upper rim 40 and handle assembly 60 are a unitarily molded piece. The outer large handle portion 62 also preferably has a curved outer edge 70 that extends generally an even spacing from the inner edge 68 so that the handle portion 62 forms an inverted U-shape. In a preferred embodiment, the large handle portion 62 has a width around its length of about 0.75 inches. Of course, other more angular shapes may be utilized.

The nested handle portion 64 includes a plurality of apertures formed along a vertical centerline that enable suspension from a variety of different objects. First of all, a small hole 80 adjacent a top edge is sized to receive a nail or other thin item such as a small hook sticking out of an adjacent support, such as a wall or railing. Below the hole 80 is a larger aperture defining from top to bottom: a small aperture or hook slot 82, a circular medium-sized aperture 84 and a circular large aperture 86. The apertures are open to each other with the medium-sized aperture 84 connected to and below the small aperture 82, and the large aperture 86 connected to and below the medium-sized aperture 84. Uses for these apertures will be described below, but it will be understood that these holes/apertures provide at least three and preferably at least four differently-sized hanging openings for different objects, as needed.

In one embodiment, a width of the rear strip 42 of the rim 40 is between about 6-12 inches, and the handle assembly 60 is slightly more than half that width. For instance, the lateral width of the rear strip 42 is 7.0 inches and the lateral width of the handle assembly 60 is 5.5 inches. In a preferred embodiment, the handle assembly 60 has a vertical height above the rear strip 42 of about 6.5 inches, a width at its base of about 5.5 inches, a large circular aperture 86 having a diameter of about 2.5 inches, a medium-sized circular aperture 84 with a diameter of about 1.5 inches, and a hook slot 82 with a width of about 0.5 inch. The small hole 80 may be 0.25 inches in diameter. Of course, these dimensions are exemplary only and may be adjusted based on expected use.

FIG. 3 illustrates two of the trash bags 20 hanging from different objects within a vehicle passenger compartment. A trash bag 20 on the left is shown suspended from a thick hook 90 behind the driver's seat which fits closely within the medium-sized circular aperture 84 of the nested handle portion 64. On the right, a trash bag 20 is suspended from one of the passenger seat armrests 92. The large handle portion 62, separated from the nested handle portion 64, fits around the armrest 92.

FIG. 4 shows two of the trash bags 20 hanging from different objects on a door. A first trash bag 20 is seen suspended from a thick hook 94, which rests in the medium-sized circular aperture 84. The positioning of the trash bag 20 also suggests a possible playful use as a basketball net-like target for dry trash such as wadded paper. A second trash bag 20 hangs from a door knob 96, which fits closely within the large circular aperture 86 of the nested handle portion 64. FIG. 5 shows several of the trash bags hanging from the outside of an office desk. Both trash bags 20 hand from thick hooks 98 which fit closely within the medium-sized circular aperture 84 of the nested handle portion 64. In all of these uses, the rear wall of the trash bag 20 abuts flush against the vertical support surface with the front part sticking out therefrom, which facilitates depositing trash into the open mouth 22.

These potential placements of the trash bags 20 illustrate just a few contemplated, and those of skill in the art will understand that the possibilities are endless. The variety of different handle apertures enables the versatile placement of the trash bags 20. Moreover, when the trash bag 20 is full, the large handle portion 62 can be used as a robust grasping handle to allow the user to dispose of the trash without touching the pouch portion 24.

While the invention has been described in its preferred embodiments, it is to be understood that the words which have been used are words of description and not of limitation. Therefore, changes may be made within the appended claims without departing from the true scope of the invention.

What is claimed is:

1. A bag, comprising:
   a pouch portion made of a flexible material defining a cavity within walls and an open top edge;
   an upper rim formed of a narrow band of material that is more rigid than the flexible material and is secured around the top edge of the pouch portion, the upper rim having an elasticity and relaxed shape that defines an open mouth of the bag, the upper rim further including closure elements on a front strip and a rear strip that may be mated to effect closure of the open mouth; and
   a handle assembly extending upward from the rear strip having at least three differently-sized apertures for suspending the bag from a variety of differently-sized objects, wherein the handle assembly includes a large handle portion surrounding a nested handle portion having the three differently-sized apertures, and wherein the large handle portion and nested handle portion are formed as a single piece with a score line therebetween that may be easily severed.

2. The bag of claim 1, wherein the bag is a trash bag and is formed of plastics, with a thin-walled plastic for the pouch portion and a thicker plastic for the upper rim and handle assembly.

3. The bag of claim 2, wherein the upper rim and handle assembly are a unitarily molded piece.

4. The bag of claim 1, wherein the closure elements comprise at least one bead extending forward from the rear strip aligned with a complementary hole in the front strip and sized so that the bead may be forced through the hole to effect closure of the open mouth.

5. The bag of claim 1, wherein the closure elements are selected from the group consisting of Velcro strips and adhesive strips.

6. The bag of claim 1, wherein the large handle portion has an inverted U-shape.

7. The bag of claim 1, wherein the rear strip extends linearly and the front strip has a generally semi-circular shape when in a relaxed configuration extending forward from the rear strip at least 4.5 inches.

8. A bag, comprising:
   a pouch portion made of a flexible material defining a cavity within walls and an open top edge;
   an upper rim formed of a narrow band of material that is more rigid than the flexible material and is secured around the top edge of the pouch portion, the upper rim having an elasticity and relaxed shape that defines an open mouth of the bag, the upper rim further including closure elements on a front strip and a rear strip that may be mated to effect closure of the open mouth; and
   a handle assembly extending upward from the rear strip having a large handle portion surrounding a nested handle portion with multiple apertures for suspending the bag from a variety of differently-sized objects, wherein the large handle portion and nested handle portion are formed as a single piece with a score line therebetween that may be easily severed such that the two handle portions may remain connected together or separated along the score line so that the large handle portion may be used to suspend the bag from an object.

9. The bag of claim 8, wherein the bag is a trash bag and is formed of plastics, with a thin-walled plastic for the pouch portion and a thicker plastic for the upper rim and handle assembly.

10. The bag of claim 9, wherein the upper rim and handle assembly are a unitarily molded piece.

11. The bag of claim 8, wherein the closure elements comprise at least one bead extending forward from the rear strip aligned with a complementary hole in the front strip and sized so that the bead may be forced through the hole to effect closure of the open mouth.

12. The bag of claim 11, wherein there are two beads and complementary holes.

13. The bag of claim 8, wherein there are at least three differently-sized apertures of the multiple apertures on the nested handle portion include a small aperture sized to receive a small-sized object, a middle-sized aperture connected to and below the small aperture sized to receive a second larger-sized object, and a large aperture connected to and below the middle-sized aperture sized to receive a third even larger-sized object.

14. The bag of claim 13, wherein the three differently-sized apertures are aligned along a vertical centerline of the nested handle portion.

15. The bag of claim 8, wherein the large handle portion has an inverted U-shape.

16. The bag of claim 8, wherein the rear strip extends linearly and the front strip has a generally semi-circular shape when in a relaxed configuration extending forward from the rear strip at least 4.5 inches.

17. The bag of claim 8, wherein the closure elements are selected from the group consisting of Velcro strips and adhesive strips.

* * * * *